United States Patent
Kim et al.

(10) Patent No.: US 12,040,482 B2
(45) Date of Patent: Jul. 16, 2024

(54) SULFUR-CARBON COMPOSITE, POSITIVE ELECTRODE FOR LITHIUM-SULFUR BATTERY COMPRISING SAME, AND LITHIUM-SULFUR BATTERY COMPRISING POSITIVE ELECTRODE

(71) Applicant: LG ENERGY SOLUTION, LTD., Seoul (KR)

(72) Inventors: Soohyun Kim, Daejeon (KR); Jangbae Kim, Daejeon (KR); Jehoon Lee, Daejeon (KR); Wansoo Chang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 490 days.

(21) Appl. No.: 17/425,213

(22) PCT Filed: May 29, 2020

(86) PCT No.: PCT/KR2020/007001
§ 371 (c)(1),
(2) Date: Jul. 22, 2021

(87) PCT Pub. No.: WO2020/242247
PCT Pub. Date: Dec. 3, 2020

(65) Prior Publication Data
US 2022/0085358 A1    Mar. 17, 2022

(30) Foreign Application Priority Data

May 31, 2019  (KR) .................... 10-2019-0064310
May 29, 2020  (KR) .................... 10-2020-0064835

(51) Int. Cl.
*H01M 4/36*   (2006.01)
*C08K 3/04*   (2006.01)
(Continued)

(52) U.S. Cl.
CPC .......... *H01M 4/366* (2013.01); *C09D 125/18* (2013.01); *H01M 4/38* (2013.01); *H01M 4/587* (2013.01);
(Continued)

(58) Field of Classification Search
CPC ............ H01M 4/366; H01M 2004/028; C09D 125/18; C08K 3/04; C08K 3/06
See application file for complete search history.

(56) References Cited

U.S. PATENT DOCUMENTS

2008/0169059 A1*  7/2008  Messersmith .............. C09J 7/00
                                                       427/256
2015/0221935 A1*  8/2015  Zhou ...................... H01M 4/366
                                                       427/221
(Continued)

FOREIGN PATENT DOCUMENTS

EP    3 671 919 A2    6/2020
EP    3 896 892 A2    8/2020
(Continued)

OTHER PUBLICATIONS

International Search Report (PCT/ISA/210) issued in PCT/KR2020/007001, dated Sep. 3, 2020.
(Continued)

*Primary Examiner* — Aiqun Li
(74) *Attorney, Agent, or Firm* — Birch, Stewart, Kolasch & Birch, LLP

(57) ABSTRACT

Disclosed is a sulfur-carbon composite including a carbon material, a coating on the carbon material which comprises a copolymer containing a monomer unit containing a catechol group and a monomer unit containing a lithium ion conductor, and sulfur. Also disclosed is an electrode for lithium-sulfur battery including the same, and a lithium-sulfur battery including the electrode.

13 Claims, 5 Drawing Sheets

(51) Int. Cl.
  *C08K 3/06* (2006.01)
  *C09D 125/18* (2006.01)
  *H01M 4/02* (2006.01)
  *H01M 4/38* (2006.01)
  *H01M 4/587* (2010.01)
  *H01M 10/052* (2010.01)

(52) U.S. Cl.
  CPC ............ *H01M 10/052* (2013.01); *C08K 3/04* (2013.01); *C08K 3/06* (2013.01); *H01M 2004/028* (2013.01)

(56) References Cited

U.S. PATENT DOCUMENTS

| | | |
|---|---|---|
| 2015/0288027 A1 | 10/2015 | Lee et al. |
| 2015/0325850 A1* | 11/2015 | Jang .................... H01M 4/0402 427/122 |
| 2016/0164103 A1* | 6/2016 | Son ...................... H01M 4/405 429/188 |
| 2017/0214047 A1 | 7/2017 | Naito et al. |
| 2018/0298249 A1 | 10/2018 | Wilker et al. |
| 2019/0245203 A1 | 8/2019 | Cho et al. |
| 2020/0161658 A1 | 5/2020 | Yoon et al. |

FOREIGN PATENT DOCUMENTS

| | | |
|---|---|---|
| JP | 6256960 B2 | 1/2018 |
| KR | 10-2015-0116737 A | 10/2015 |
| KR | 10-2016-0145991 A | 12/2016 |
| KR | 10-2018-0015707 A | 2/2018 |
| KR | 10-2018-0033665 A | 4/2018 |
| KR | 10-2018-0048309 A | 5/2018 |
| KR | 10-2019-0032933 A | 3/2019 |
| KR | 10-2019-0038332 A | 4/2019 |
| KR | 10-2019-0047903 A | 5/2019 |
| KR | 10-2019-0047907 A | 5/2019 |
| WO | WO 2012/047329 A2 | 4/2012 |
| WO | WO 2015/152176 A1 | 10/2015 |

OTHER PUBLICATIONS

Patil et al., "Mussel-inspired protein-repelling ambivalent block copolymers: controlled synthesis and characterization," Polymer Chemistry, vol. 6, 2015, pp. 2919-2933.

Ahad et al., "Catecholamine-Functionalized Reduced Graphene Oxide: A Scalable Carbon Host for Stable Cycling in Lithium-Sulfur Batteries," Electrochemica Acta, Elsevier, vol. 246, Jun. 13, 2017, XP085154991, pp. 451-458 (8 pages total).

Extended European Search Report for European Application No. 20815429.4, dated Feb. 23, 2022.

\* cited by examiner

[Figure 1]
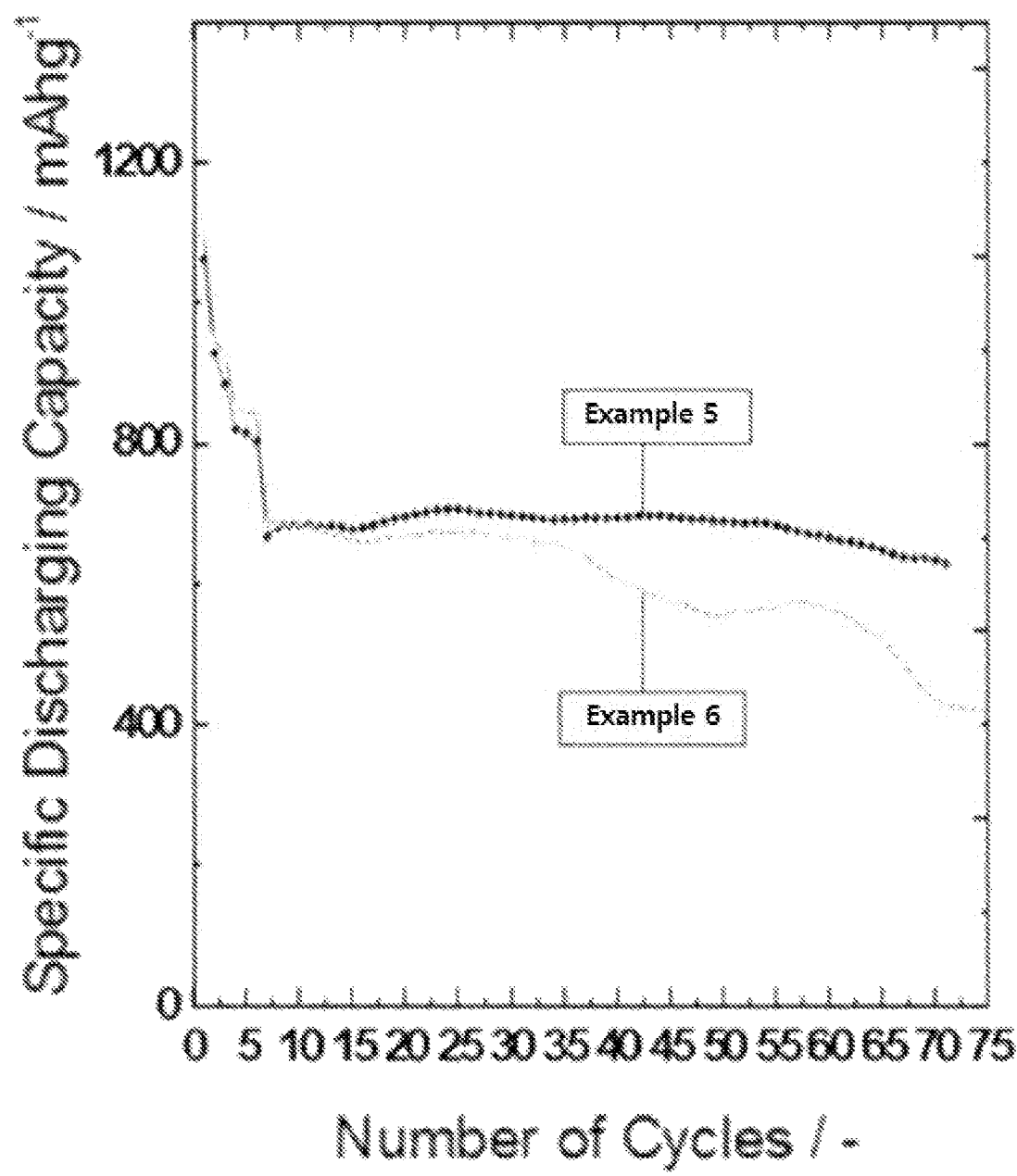

【Figure 2】
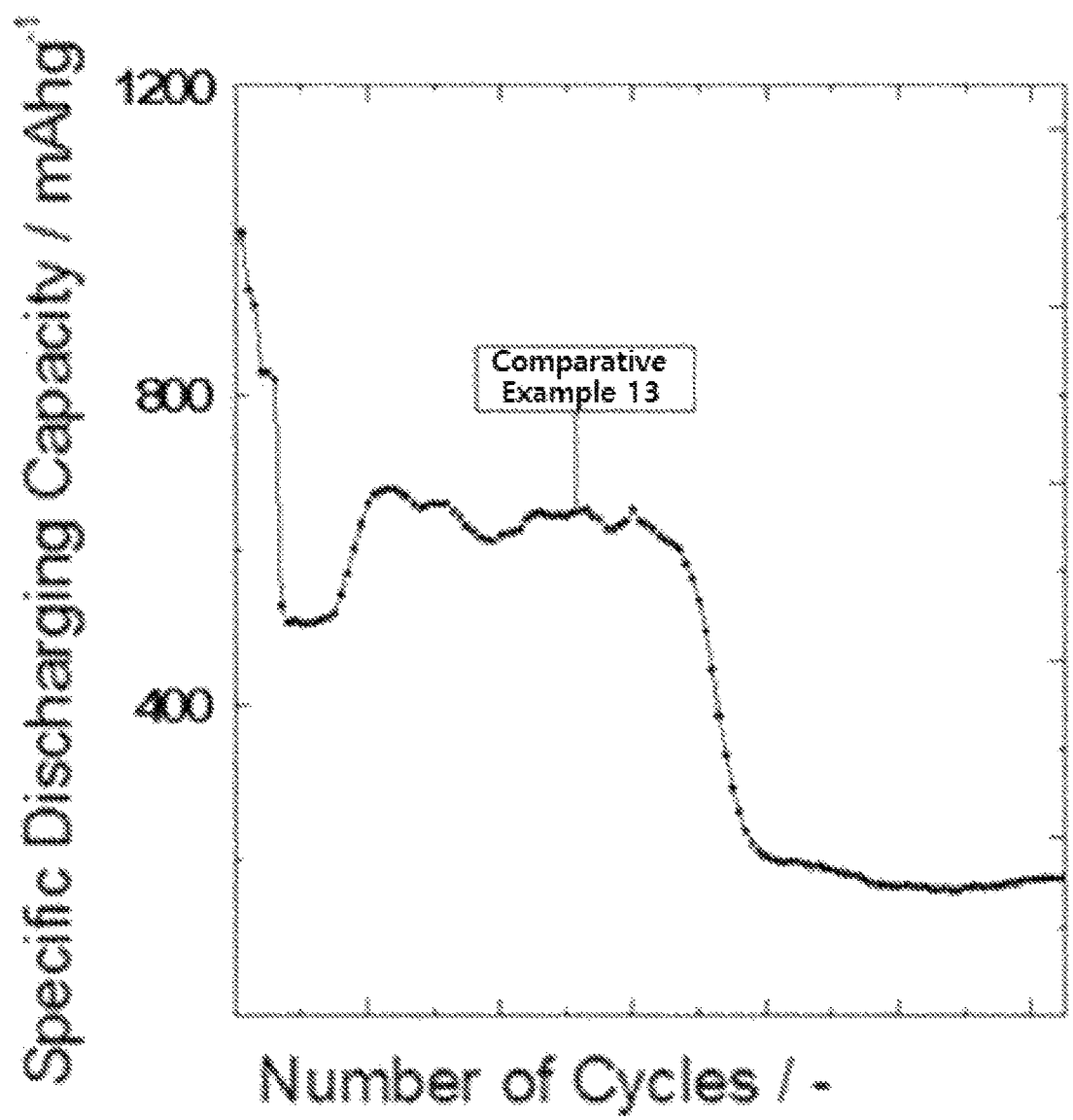

【Figure 3】
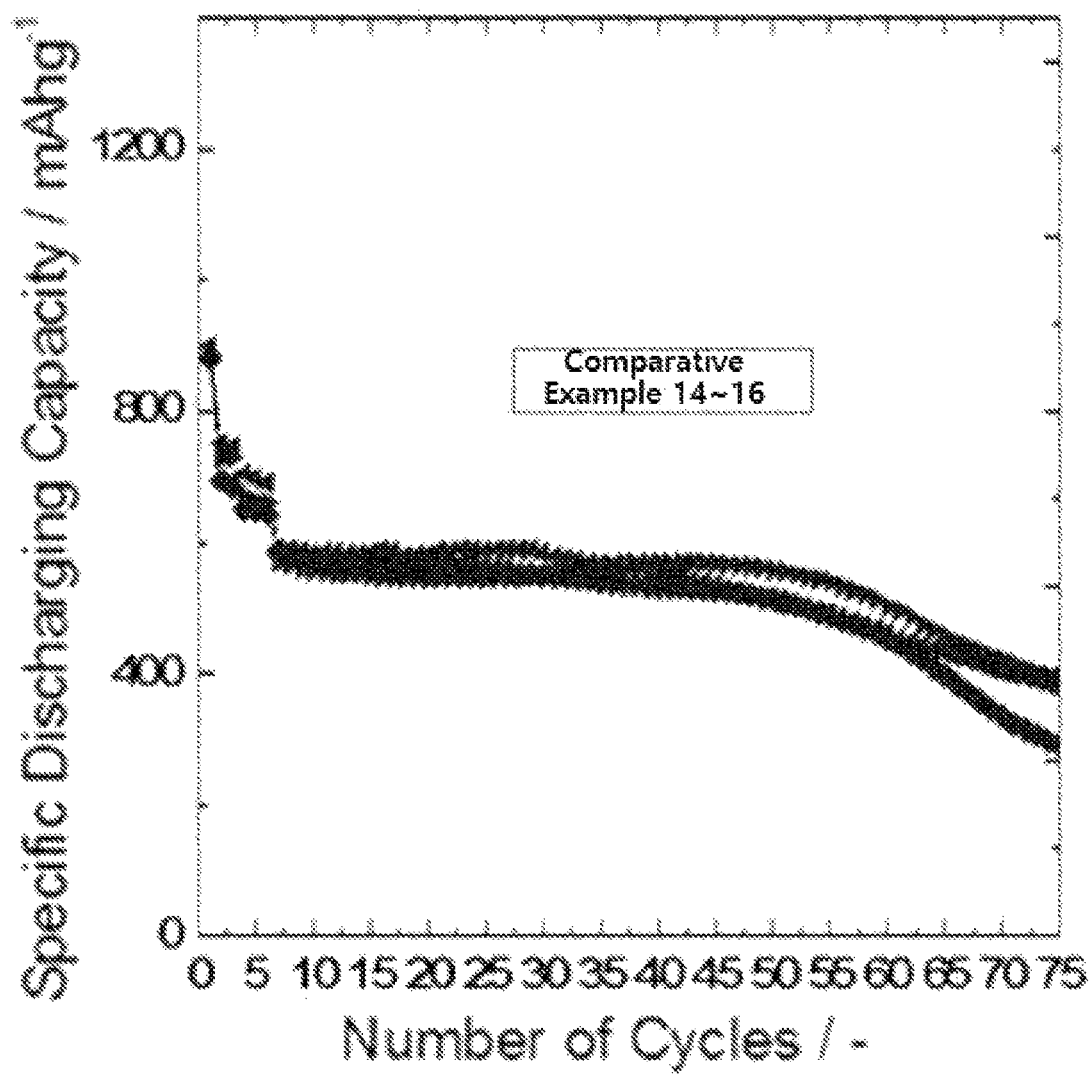

【Figure 4】
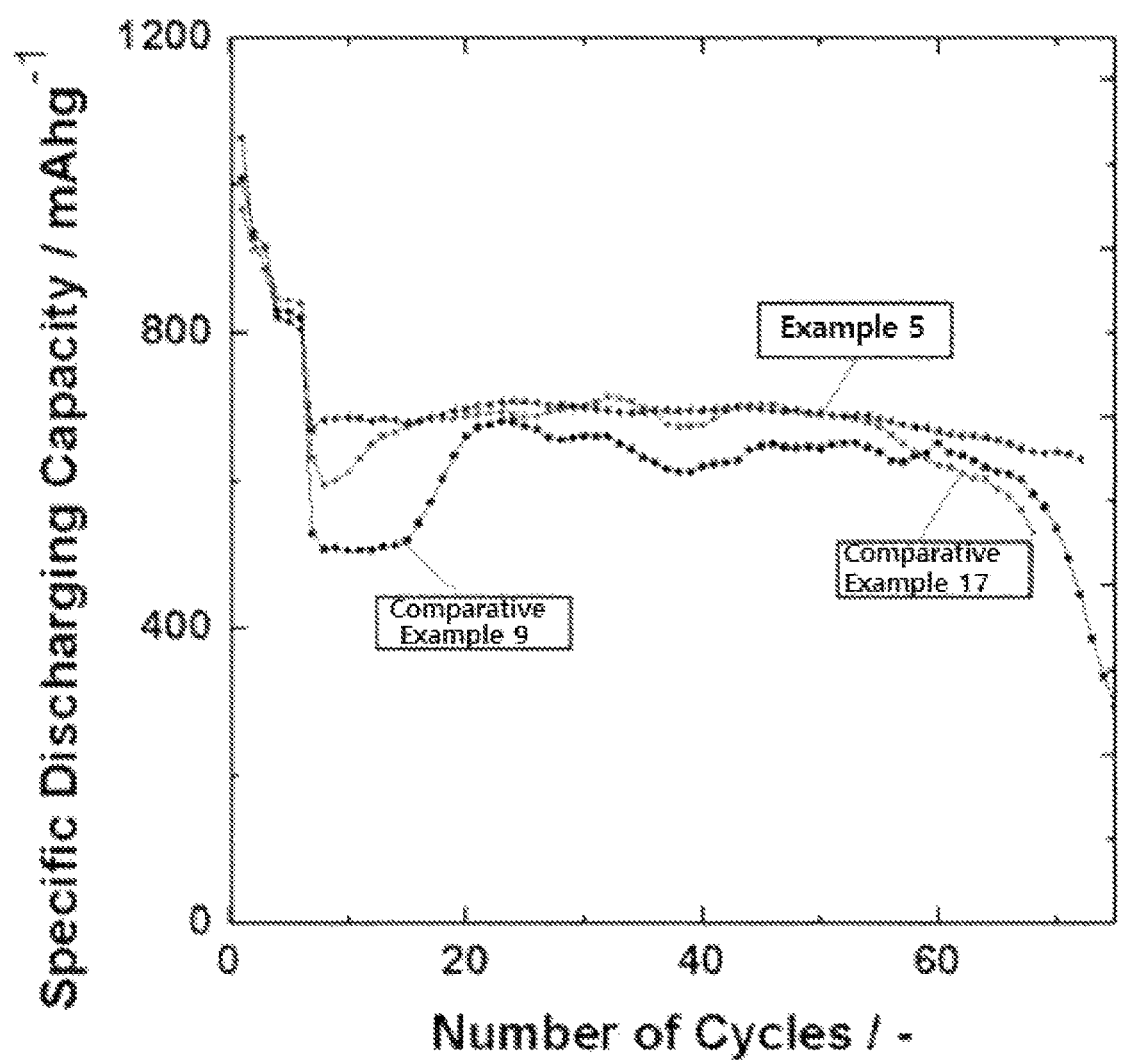

【Figure 5】
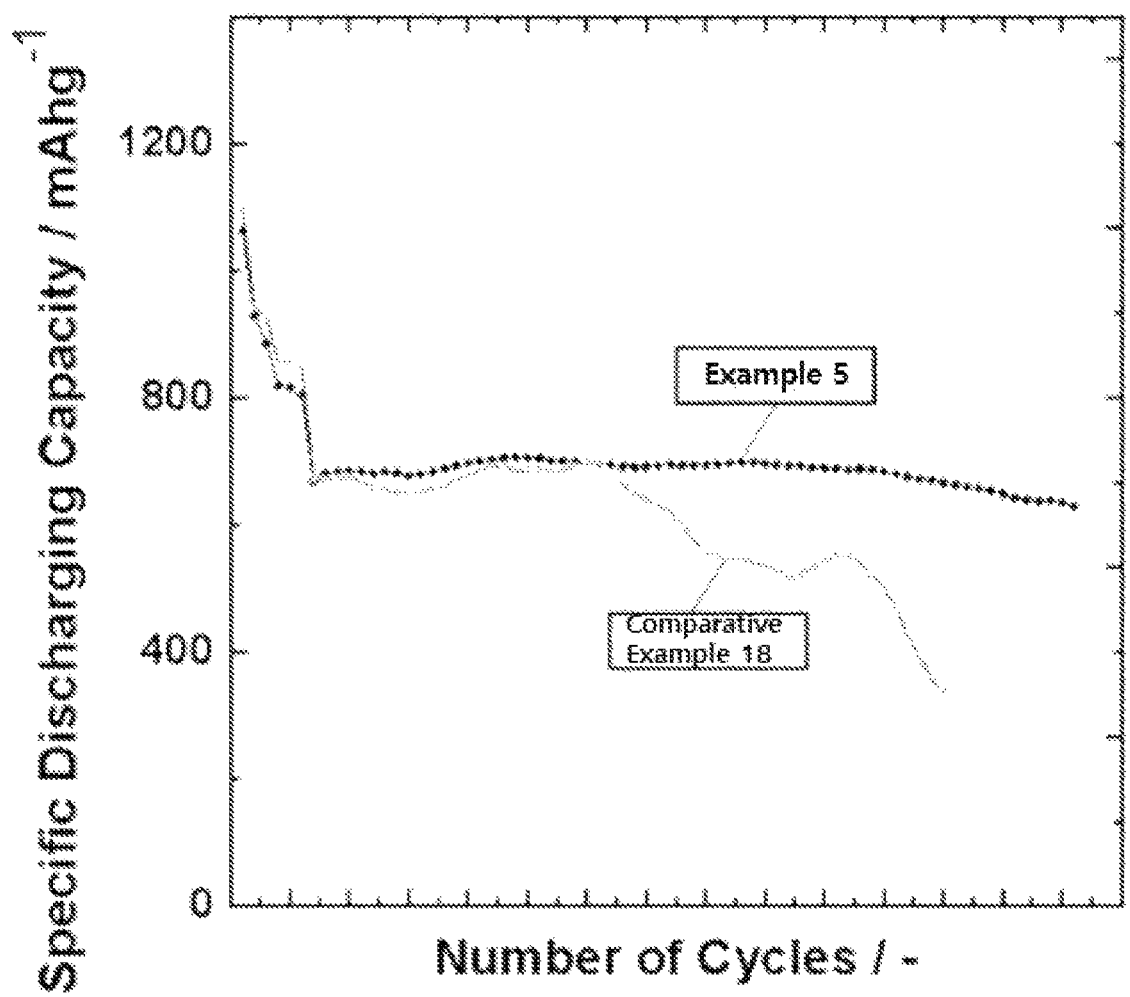

SULFUR-CARBON COMPOSITE, POSITIVE ELECTRODE FOR LITHIUM-SULFUR BATTERY COMPRISING SAME, AND LITHIUM-SULFUR BATTERY COMPRISING POSITIVE ELECTRODE

TECHNICAL FIELD

This application claims the benefits of priorities based on Korean Patent Application No. 10-2019-0064310 filed on May 31, 2019 and Korean Patent Application No. 10-2020-0064835 filed on May 29, 2020, the entire contents of which are incorporated herein by reference.

The present invention relates to a sulfur-carbon composite, a positive electrode for a lithium-sulfur battery comprising the same, and a lithium-sulfur battery comprising the positive electrode.

BACKGROUND ART

As the utilization range of lithium secondary batteries is expanded not only to portable electronic devices and communication devices, but also to electric vehicles (EV) and electric storage systems (ESS), the demand for high capacity of lithium secondary batteries used as their power sources is increasing.

The lithium-sulfur battery among various lithium secondary batteries is a secondary battery using a sulfur-based material having a sulfur-sulfur bond as a positive electrode active material and using lithium metal, a carbon-based material in which intercalation/deintercalation of lithium ions occurs, or silicon or tin that forms an alloy with lithium as a negative electrode active material.

There is an advantage that sulfur, which is the main material of the positive electrode active material in the lithium-sulfur battery, has a low atomic weight, is very rich in resources and thus easy to supply and receive, and is cheap, non-toxic and environmentally friendly.

Since the theoretical energy density of the lithium-sulfur battery is much higher than the theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) and commercial lithium secondary batteries (LiCoO$_2$/graphite), the lithium-sulfur battery is attracting attention as a high-capacity, eco-friendly and low-cost lithium secondary battery.

In the lithium-sulfur battery, since sulfur, which is used as a positive electrode active material, has an electrical conductivity of $5 \times 10^{-30}$ S/cm, and thus is a non-conductor that does not have electrical conductivity, there is a problem that the movement of electrons generated by the electrochemical reaction is difficult. As such, it is being used in combination with a conductive material such as carbon that can provide an electrochemical reaction site.

However, although the initial capacity of the lithium-sulfur battery at the time of actual operation is high, since the capacity and charging/discharging efficiency characteristics drop rapidly with the progress of the cycles, and accordingly, the lifetime is also shortened, thus it is difficult to secure sufficient performance and operation stability, and thus it has not been commercialized. The reason is that sulfur is lost and can no longer participate in the charging/discharging reaction of the battery due to leaching of lithium polysulfide which is an intermediate product generated during the electrochemical reaction of a lithium-sulfur battery, and the electrolyte solution causes side reactions on the surface of the carbon material to shorten the lifetime, or the leached lithium polysulfide is isolated and can no longer participate in the reaction.

In order to solve the problem that the electrolyte solution causes side reactions on the surface of the carbon material, and to allow lithium ions to approach carbon smoothly and react with sulfur, efforts have been made to block the decomposition of the electrolyte solution on the surface of carbon by using an organic protective material, and to increase the lithium ion conductivity.

However, in the case of a protective material that does not interact with the surface of carbon, there was a problem that its mixing is merely a physical mixing, and over time, it physically separates from the surface of the carbon and causes a side effect acting as a resistance component.

In addition, in order to solve the above problems, an attempt was made to increase the bonding force of the organic protective material by introducing —OH or —COOH groups to aromatic carbon on the surface of carbon/graphite.

However, there was a disadvantage that when the high-energy plasma treatment or UV/ozone treatment method is used to modify the surface of carbon/graphite as described above, oxidation occurs mainly at the edge portion of carbon/graphite, so the hydrophilic modification effect is low, and rather, the conjugated network is damaged (conversion of double bonds to single bonds), thereby deteriorating electrical conductivity.

PRIOR ART DOCUMENT

Patent Document

Korean Laid-open Patent Publication No. 10-2018-0033665

DISCLOSURE

Technical Problem

The inventors of the present invention have made great efforts to solve the above problems in the prior art, and as a result, have found that when using a copolymer comprising a monomer having a functional group that is well bonded to the surface of carbon and a monomer having excellent lithium ion conductivity, the above problems can be solved, and thus have completed the present invention.

Therefore, it is an object of the present invention to provide a sulfur-carbon composite which is free from the problem that the electrolyte solution and lithium polysulfide cause side reactions on the surface of the carbon material, and has excellent lithium ion conductivity, thereby improving the reactivity and lifetime characteristics of the lithium-sulfur battery.

In addition, it is still an object of the present invention to provide a positive electrode for a lithium-sulfur battery comprising the sulfur-carbon composite and a lithium-sulfur battery having excellent reactivity and lifetime characteristics.

Technical Solution

In order to achieve the above objects, the present invention provides a sulfur-carbon composite comprising a carbon material coated with a copolymer containing a monomer containing a catechol group and a monomer containing a lithium ion conductor; and sulfur.

In one embodiment of the present invention, the copolymer may be represented by Formula 1 below:

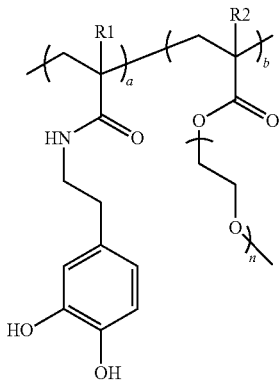

[Formula 1]

wherein,
R1 and R2 are each independently hydrogen or a methyl group,
a and b represent the molar ratio of each monomer, a is 1 to 5, and b is 5 to 9; and
n is a natural number from 1 to 20.

In addition, the present invention provides a positive electrode for a lithium-sulfur battery comprising the sulfur-carbon composite of the present invention.

In addition, the present invention provides a lithium-sulfur battery comprising a positive electrode; a negative electrode; a separator interposed between them and an electrolyte, wherein the positive electrode is the positive electrode of the present invention.

Advantageous Effects

The sulfur-carbon composite of the present invention is prepared using a carbon material coated with a copolymer containing a monomer containing a catechol group and a monomer containing a lithium ion conductor, so that the problem that the electrolyte solution and lithium polysulfide cause side reactions on the surface of the carbon material of the sulfur-carbon composite can be effectively solved.

In addition, the sulfur-carbon composite of the present invention is free from the above problems and has excellent lithium ion conductivity, thereby providing an effect of improving the reactivity and lifetime characteristics of the lithium-sulfur battery.

DESCRIPTION OF DRAWINGS

FIG. 1 is a graph showing the measurement results of lifetime characteristics of a battery using the sulfur-carbon composite of the present invention.

FIG. 2 is a graph showing the measurement results of the reactivity and lifetime characteristics of a battery using a conventional sulfur-carbon composite.

FIG. 3 is a graph showing the measurement results of the reactivity and lifetime characteristics of a battery using a sulfur-carbon composite whose surface is coated with the copolymer used in the present invention.

FIGS. 4 and 5 are graphs showing the measurement results of the reactivity and lifetime characteristics of batteries using the sulfur-carbon composite of the present invention and a conventional sulfur-carbon composite.

BEST MODE

Hereinafter, the present invention will be described in detail.

The present invention relates to a sulfur-carbon composite comprising a carbon material coated with a copolymer containing a monomer containing a catechol group and a monomer containing a lithium ion conductor, and sulfur.

Typically, since the carbon material is a material having very low polarity, it is not well coated with an organic protective material, and even if coated, the coating material is easily peeled off physically.

The present invention is characterized by providing a solution to the above problems. That is, the coating copolymer of the present invention comprises a hydrophilic copolymer containing a monomer containing a catechol group, which is an adhesive material derived from mussels, and thus provides excellent adhesion force to the surface of the carbon material. That is, the catechol group adheres well to any surface, particularly even to the surface of carbon-based or graphite-based particles. In addition, the coating copolymer of the present invention contains a monomer containing a lithium ion conductor, thereby providing features that enhance lithium ion conductivity.

In the present invention, "a carbon material coated with a copolymer containing a monomer containing a catechol group and a monomer containing a lithium ion conductor" should be understood as a concept comprising a carbon material coated with a coating composition containing the copolymer. In the case of the coating composition, well-known components such as solvents and binders commonly used in this field in addition to the copolymer may be further comprised in the usual composition ratio.

In the copolymer, the molar ratio of the monomer containing the catechol group and the monomer containing the lithium ion conductor may be 1 to 5:5 to 9, more preferably 1 to 3:7 to 9, and more preferably 2 to 3:7 to 8.

Specifically, if the molar ratio of the monomer containing the catechol group is out of the above-described range and thus is insufficient, there may be a problem of insufficient adhesion force to the carbon material. If the molar ratio of the monomer containing the lithium ion conductor is out of the above-described range and thus is insufficient, there may be a problem that the lithium ion conductivity is lowered. If each component is comprised in an excessive amount outside the above-mentioned range, problems as opposed to the above may occur, which is not preferable.

As the monomer containing the lithium ion conductor, it possible to use a monomer which has lithium ion conductivity and is capable of polymerizing with the monomer containing the catechol group.

The monomer containing the lithium ion conductor may be a monomer containing at least one selected from an ethylene oxide group, a sulfone group, and the like. The monomer may be a monomer containing a vinyl group, and for example may be (meth)acrylic monomer.

More specifically, the monomer containing the lithium ion conductor may be polyethylene glycol methyl ether (meth)acrylate monomer and the like.

The number of the repeating unit of the ethylene oxide group contained in the polyethylene glycol methyl ether group contained in the polyethylene glycol methyl ether (meth)acrylate monomer may be 1 to 20, and more preferably 1 to 10.

If the number of repeating units of the ethylene oxide group is less than the above-described range, there may be a problem of insufficient lithium ion conductivity. If the number of repeating units of the ethylene oxide group exceeds the above-described range, there may be a problem that the resistance of the electrode is increased.

The portion described as "(meth)acrylate" should be interpreted as a concept comprising methacrylate and acrylate.

The copolymer may have a weight average molecular weight of 5,000 to 1,000,000, more preferably 150,000 to 300,000, and even more preferably 200,000 to 300,000. If the weight average molecular weight is less than the above-described range, there may be a problem that the adhesion force to the carbon material is insufficient. If the weight average molecular weight exceeds the above-mentioned range, there may be a problem that the resistance of the electrode is increased, which is not preferable.

It may be preferable that the copolymer is a random copolymer. This is because, when each monomer is distributed as uniformly as possible, better lithium ion conductivity and adhesion force can be exhibited.

The monomer containing the catechol group may be a vinyl-based monomer, for example, a dopamine (meth) acrylamide monomer.

Specifically, the copolymer may be a copolymer represented by Formula 1 below:

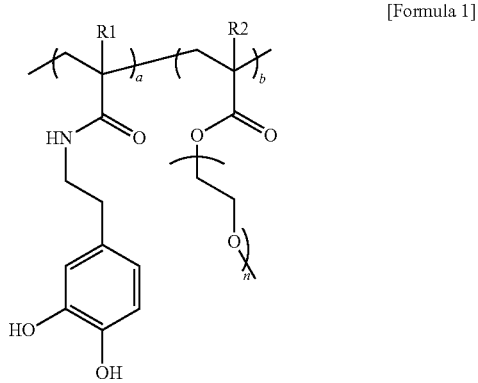

[Formula 1]

wherein,
R1 and R2 are each independently hydrogen or a methyl group,
a and b represent the molar ratio of each monomer, and a is 1 to 5, b is 5 to 9; and
n is a natural number from 1 to 20.

The molar ratio of a to b of the copolymer represented by Formula 1 is more preferably 1 to 3:7 to 9, and more preferably 2 to 3:7 to 8.

If the molar ratio of a and b is outside the above-mentioned range, specifically, if the molar ratio of the monomer containing the catechol group is out of the above-described range and thus is insufficient, there may be a problem of insufficient adhesion force to the carbon material. If the molar ratio of polyethylene glycol methyl ether (meth)acrylate monomer is out of the above-described range and thus is insufficient, there may be a problem that the lithium ion conductivity is lowered. If each component is comprised in an excessive amount outside the above-mentioned range, problems as opposed to the above may occur, which is not preferable.

n may be a natural number from 1 to 20, more preferably 1 to 10, and even more preferably from 1 to 5.

If the value of n is less than the above-described range, there may be a problem that the lithium ion conductivity is insufficient. If the value of n exceeds the above-described range, there may be a problem that the resistance of the electrode is increased.

The copolymer may have a weight average molecular weight of 5,000 to 1,000,000, more preferably 150,000 to 300,000, and even more preferably 200,000 to 300,000. If the weight average molecular weight is less than the above-described range, there may be a problem that the adhesion force to the carbon material is insufficient. If the weight average molecular weight exceeds the above-mentioned range, there may be a problem that the resistance of the electrode is increased, which is not preferable.

The copolymer represented by Formula 1 may be prepared according to Reaction Scheme 1 below:

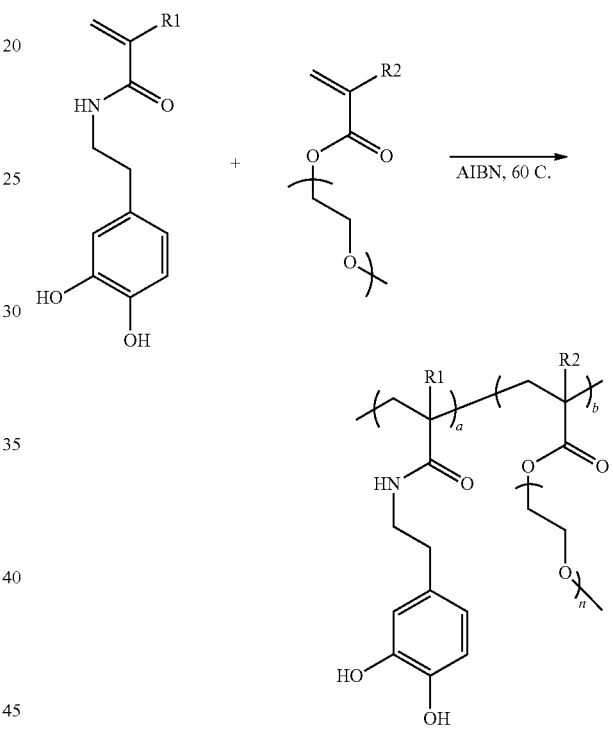

[Reaction Scheme 1]

Specifically, first, the inhibitor of the polyethylene glycol methyl ether (meth)acrylate monomer is removed using column chromatography filled with basic alumina. The inhibitor refers to an additive added at a level of 100 ppm to prevent self photo-curing or heat-curing of the polyethylene glycol methyl ether (meth)acrylate monomer, and for example, may be BHT (2,6-Di-tert-butyl-4-methylphenol) and MEHQ (4-methoxyphenol).

After adding a solvent such as DMF (dimethyl formamide) to the reactor, the purified polyethylene glycol methyl ether (meth)acrylate monomer, dopamine (meth)acrylamide monomer, and polymerization initiator are added.

Next, the reaction mixture is degassed with nitrogen gas, and then reacted for 10 to 25 hours while stirring at 40 to 80° C.

When the reaction is completed, the product is precipitated using n-hexane or the like to obtain a copolymer.

The carbon material used in the preparation of sulfur-carbon composite of the present invention may be at least one selected from the group consisting of graphite, graphene, carbon black, carbon nanotubes, carbon fibers, carbon nanoribbons, carbon nanobelts, carbon nanorods, activated carbon and the like.

The carbon material may be preferably a porous carbon material.

In the sulfur-carbon composite of the present invention, it may have a weight ratio of the copolymer, which contains the monomer containing the catechol group and the monomer containing the lithium ion conductor, and the carbon material in a range of 0.1:99.9 to 5:95, more preferably from 0.5:99.5 to 3:97, even more preferably from 0.5:99.5 to 2:98, particularly preferably from 0.5:99.5 To 1.5:98.5.

If the copolymer is comprised below the above-mentioned range, it is difficult to effectively prevent side reactions of electrolyte solution and lithium polysulfide. If the copolymer exceeds the above-described range, reactivity and lifetime characteristics of the battery may be deteriorated, which is not preferable.

In the sulfur-carbon composite of the present invention, the sulfur may be at least one selected from the group consisting of inorganic sulfur, $Li_2S_n$ ($n \geq 1$), disulfide compounds, organic sulfur compounds, carbon-sulfur polymers and the like.

In the sulfur-carbon composite of the present invention, the carbon material may be contained in an amount of 10 to 50% by weight, preferably 20 to 40% by weight based on the total weight of the sulfur-carbon composite. The carbon material may be preferably a porous carbon material.

In the sulfur-carbon composite of the present invention, the sulfur may be contained in an amount of 50 to 90% by weight, preferably 60 to 80% by weight based on the total weight of the sulfur-carbon composite.

Accordingly, the weight ratio of the carbon material and sulfur in the sulfur-carbon composite of the present invention may be 5:5 to 9:1, preferably 7:3 to 9:1.

If the content of the sulfur is less than the above-mentioned range, as the content of the porous carbon material of the sulfur-carbon composite relatively increases, and the specific surface area increases and thus when preparing the slurry, the content of the binder is increased. The increase in the amount of the binder used may eventually increase the sheet resistance of the positive electrode, and thus may act as an insulator to prevent electron pass, thereby deteriorating the performance of the battery. On the contrary, if the content of the sulfur exceeds the above-mentioned range, sulfur that does not associate with the porous carbon material agglomerate with each other or are re-leached to the surface of the porous carbon material, and thus may be difficult to receive electrons, and cannot participate in an electrochemical reaction, resulting in a loss of capacity of the battery In addition, the present invention relates to a positive electrode for a lithium-sulfur battery comprising the sulfur-carbon composite of the present invention.

In the positive electrode, for other constitutions except for the sulfur-carbon composite of the present invention, techniques known in this field can be applied without limitation.

The sulfur-carbon composite may be comprised as a positive electrode active material in the positive electrode.

The positive electrode may further comprise one or more additives, in addition to the positive electrode active material, selected from transition metal elements, group IIIA elements, group IVA elements, sulfur compounds of these elements, and alloys of these elements with sulfur.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg or the like, the group IIIA elements may comprise Al, Ga, In, Tl or the like, and the group IVA elements may comprise Ge, Sn, Pb, or the like.

The positive electrode may further comprise an electrically conductive material for smoothly moving electrons within the positive electrode and a binder for well attaching the positive electrode active material to the current collector, along with the positive electrode active material or optionally additives.

The electrically conductive material is a material that electrically connects the electrolyte and the positive electrode active material to serve as a path for electrons to move from the current collector to the positive electrode active material, and can be used without limitation as long as it has electrical conductivity.

For example, the electrically conductive material may comprise carbon black such as Super-P, Denka black, acetylene black, Ketjen black, channel black, furnace black, lamp black, thermal black, carbon black; carbon derivatives such as carbon nanotubes or fullerenes; electrical conductivity fibers such as carbon fibers and metal fibers; carbon fluoride; metal powders such as aluminum and nickel powders; or conductive polymers such as polyaniline, polythiophene, polyacetylene, polypyrrole alone or in combination of two or more.

The content of the electrically conductive material may be added in an amount of 0.01 to 30% by weight based on the total weight of the mixture containing the positive electrode active material.

The binder serves to maintain the positive electrode active material on the positive electrode current collector and to organically connect between positive electrode active materials, thereby increasing the binding force between them. As the binder, any binder known in the art can be used.

The content of the binder may be added in an amount of 0.5 to 30% by weight based on the total weight of the mixture containing the positive electrode active material. If the content of the binder is less than 0.5% by weight, the physical properties of the positive electrode are lowered, and the active material and the electrically conductive material in the positive electrode may be detached. If the content of the binder exceeds 30% by weight, the ratio of the active material to the electrically conductive material in the positive electrode is relatively reduced, so that the capacity of the battery can be reduced.

The positive electrode can be prepared by a conventional method known in the art.

In addition, the present invention relates to a lithium-sulfur battery comprising a positive electrode; a negative electrode; a separator interposed between them and an electrolyte, wherein the positive electrode is the positive electrode of the present invention.

In the lithium-sulfur battery, for other constitutions except for the sulfur-carbon composite of the present invention, techniques known in this field can be applied without limitation.

The negative electrode may be composed of a current collector and a negative electrode active material layer formed on one or both surfaces thereof. In addition, the negative electrode may be a lithium metal plate.

The current collector is for supporting the negative electrode active material and is not particularly limited as long as it is electrochemically stable in the voltage range of the lithium secondary battery while having excellent electrical conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector can enhance the bonding force with the negative electrode active material by having fine irregularities on its surface, and may be formed in various forms such as film, sheet, foil, mesh, net, porous body, foam, or nonwoven fabric.

The negative electrode active material may comprise a material capable of reversibly intercalating or deintercalating lithium ion ($Li^+$), a material capable of reacting with lithium ion to reversibly form lithium containing compounds, or lithium metal or lithium alloy.

The material capable of reversibly intercalating or deintercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, specifically, in the form of a lithium metal thin film or a lithium metal powder.

A separator is additionally comprised between the positive electrode and the negative electrode. The separator enables the transport of lithium ions between the positive electrode and the negative electrode while separating or insulating the positive electrode and the negative electrode from each other. The separator may be made of a porous, nonconductive or insulating material. The separator may be an independent member such as a film or a coating layer added to the positive electrode and/or the negative electrode.

The material constituting the separator comprises, for example, but is not limited to, polyolefins such as polyethylene and polypropylene, glass fiber filter paper, and ceramic materials, and the thickness thereof may be about 5 to about 50 μm, preferably about 5 to about 25 μm.

The electrolyte is located between the positive electrode and the negative electrode and comprises lithium salt and a non-aqueous organic solvent.

The concentration of the lithium salt may be 0.2 to 2 M, preferably 0.6 to 2 M, more preferably, 0.7 to 1.7 M, depending on various factors such as the exact composition of the electrolyte, the solubility of the salt, the conductivity of the dissolved salt, the charging and discharging conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion may be reduced.

The lithium salt is not particularly limited as long as it can be conventionally used in electrolyte for a lithium-sulfur battery. For example, the lithium salt may be at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate and the like.

As the non-aqueous organic solvent, those conventionally used in an electrolyte for a lithium secondary battery may be used without limitation. For example, the organic solvent may comprise ether, ester, amide, linear carbonate, cyclic carbonate, etc. alone or in combination of two or more. Among them, representatively, ether-based compounds may be comprised.

As an example, the ether-based compound may be, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether, 1,3-dioxolane, tetrahydrofuran, and 2-methyltetrahydrofuran.

Examples of the ester of the organic solvent may comprise, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, and a mixture of two or more thereof.

Specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In addition, specific examples of the cyclic carbonate compound may comprise any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof.

Examples of such halides comprise, but are not limited to, fluoroethylene carbonate (FEC) and the like.

In addition to the above-mentioned organic solvents, N-methyl pyrrolidone, dimethyl sulfoxide, sulfolane and the like may be used.

The electrolyte may further comprise nitric acid-based compounds commonly used in the related art in addition to the above-mentioned components. Examples thereof may comprise lithium nitrate ($LiNO_3$), potassium nitrate ($KNO_3$), cesium nitrate ($CsNO_3$), magnesium nitrate ($Mg(NO_3)_2$), barium nitrate ($Ba(NO_3)_2$), lithium nitrite ($LiNO_2$), potassium nitrite ($KNO_2$), cesium nitrite ($CsNO_2$) and the like.

The injection of the electrolyte can be performed at an appropriate stage during the manufacturing process of the electrochemical device, depending on the manufacturing process and the required properties of the final product. That is, the injection can be applied before the assembly of the electrochemical device or at the final stage of the assembly of the electrochemical device.

The lithium-sulfur battery according to the present invention can be manufactured by lamination, stacking and folding processes of the separator and the electrodes, in addition to the usual winding process.

The shape of the lithium-sulfur battery is not particularly limited, and may be various shapes such as a cylindrical shape, a laminate shape, and a coin shape.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

Preparation Example 1: Preparation of Copolymer Represented by Formula 1 (Monomer Molar Ratio 3:7)

The inhibitor was removed from 12.5 ml of polyethylene glycol methyl ether acrylate (PEGMEA) by column chromatography filled with 30 g of basic alumina.

After adding 20 ml of DMF into a 500 ml two neck round bottom flask, 7.5 g of purified PEGMEA (Mn=480), 1.7 g of dopamine methacrylamide (DMA), and 106 mg of azobisisobutyronitrile were dissolved in DMF. After degassing the reaction mixture with $N_2$ (g) for 10 minutes, the mixture was stirred at 60° C. for 17 hours. After completion of the reaction, the reaction product was precipitated using 800 ml of n-hexane in a 1000 ml beaker to obtain P(DMA-co-PEGMEA) with a molar ratio of monomers of 3:7 and a weight average molecular weight of 250,000.

Preparation Example 2: Preparation of Copolymer Represented by Formula 1 (Monomer Molar Ratio 5:5)

The inhibitor was removed from 12.5 ml of polyethylene glycol methyl ether acrylate (PEGMEA) by column chromatography filled with 30 g of basic alumina.

After adding 20 ml of DMF into a 500 ml two neck round bottom flask, 10 g of purified PEGMEA (Mn=480), 1.2 g of dopamine methacrylamide (DMA), and 106 mg of azobisisobutyronitrile were dissolved in DMF. After degassing the reaction mixture with $N_2$ (g) for 10 minutes, the mixture was stirred at 60° C. for 17 hours. After completion of the reaction, the reaction product was precipitated using 800 ml of n-hexane in a 1000 ml beaker to obtain P(DMA-co-PEGMEA) with a molar ratio of monomers of 5:5 and a weight average molecular weight of 250,000.

Preparation Example 3: Preparation of P(DMA-co-PEGMEA)-Coating Carbon Material (Monomer Molar Ratio=3:7)

10 g of a P(DMA-co-PEGMEA) copolymer prepared in Preparation Example 1 was dissolved in 90 g of distilled water to prepare a coating agent having a concentration of 10% by weight, and then diluted it to be used as a coating agent.

The coating agent was mixed with 10 g of carbon nanotubes (Trade name: Multiwall CNT, Manufacturer: Aldrich) to prepare P(DMA-co-PEGMEA)-coating carbon material (Weight ratio of carbon material:P(DMA-co-PEGMEA)=99:1).

Preparation Example 4: Preparation of P(DMA-Co-PEGMEA)-Coating Carbon Material (Monomer Molar Ratio=3:7)

10 g of the P(DMA-co-PEGMEA) copolymer prepared in Preparation Example 1 was dissolved in 90 g of distilled water to prepare a coating agent having a concentration of 10% by weight, and then diluted it to be used as a coating agent.

The coating agent was mixed with 10 g of carbon nanotubes (Trade name: Multiwall CNT, Manufacturer: Aldrich) to prepare P(DMA-co-PEGMEA)-coating carbon material (Weight ratio of carbon material:P(DMA-co-PEGMEA)=98:2).

Preparation Example 5: Preparation of P(DMA-Co-PEGMEA)-Coating Carbon Material (Monomer Molar Ratio=5:5)

10 g of the P(DMA-co-PEGMEA) copolymer prepared in Preparation Example 2 was dissolved in 90 g of distilled water to prepare a coating agent having a concentration of 10% by weight, and then diluted it to be used as a coating agent.

The coating agent was mixed with 10 g of carbon nanotubes (Trade name: Multiwall CNT, Manufacturer: Aldrich) to prepare P(DMA-co-PEGMEA)-coating carbon material (Weight ratio of carbon material:P(DMA-co-PEGMEA)=99:1).

Example 1: Preparation of Sulfur-Carbon Composite

The P(DMA-co-PEGMEA) coated carbon material prepared in Preparation Example 3 and sulfur (Se) were evenly mixed at a weight ratio of 3:7, placed in an oven at 155° C. and treated for 30 minutes to prepare a sulfur-carbon composite.

Example 2: Preparation of Sulfur-Carbon Composite

The P(DMA-co-PEGMEA)-coating carbon material prepared in Preparation Example 4 and sulfur (Se) were evenly mixed at a weight ratio of 3:7, placed in an oven at 155° C. and treated for 30 minutes to prepare a sulfur-carbon composite.

Comparative Example 1: Preparation of Sulfur-Carbon Composite

Carbon nanotubes (Trade name: Multiwall CNT, Manufacturer: Aldrich) and sulfur (Se) were evenly mixed at a weight ratio of 3:7, placed in an oven at 155° C. and treated for 30 minutes to prepare a sulfur-carbon composite.

Comparative Examples 2 to 4: Preparation of Sulfur-Carbon Composite

Carbon nanotubes (Trade name: Multiwall CNT, Manufacturer: Aldrich) and sulfur (Se) were evenly mixed at a weight ratio of 3:7, placed in an oven at 155° C. and treated for 30 minutes to prepare a sulfur-carbon composite.

10 g of the P(DMA-co-PEGMEA) copolymer prepared in Preparation Example 1 was dissolved in 90 g of distilled water to prepare a coating agent having a concentration of 10% by weight, and then diluted it to be used as a coating agent.

Comparative Example 2

The coating agent was mixed with 10 g of the prepared sulfur-carbon composite to prepare a P(DMA-co-PEGMEA)-coating sulfur-carbon composite (weight ratio of sulfur-carbon composite:P(DMA-co-PEGMEA)=99.5:0.5).

Comparative Example 3

The coating agent was mixed with 10 g of the prepared sulfur-carbon composite to prepare a P(DMA-co-PEG-MEA)-coating sulfur-carbon composite (weight ratio of sulfur-carbon composite:P(DMA-co-PEGMEA)=99:1).

Comparative Example 4

The coating agent was mixed with 10 g of the prepared sulfur-carbon composite to prepare a P(DMA-co-PEG-MEA)-coating sulfur-carbon composite (weight ratio of sulfur-carbon composite:P(DMA-co-PEGMEA)=98:2).

Comparative Example 5: Preparation of Sulfur-Carbon Composite

The P(DMA-co-PEGMEA) (Monomer molar ratio 5:5)-coating carbon material prepared in Preparation Example 5 and sulfur (Se) were evenly mixed at a weight ratio of 3:7, placed in an oven at 155° C. and treated for 30 minutes to prepare a sulfur-carbon composite.

Comparative Example 6: Preparation of Sulfur-Carbon Composite

The carbon material prepared by coating PEO polymer on carbon nanotubes (trade name: Multiwall CNT, manufacturer: Aldrich) (weight ratio=99:1) and sulfur ($S_8$) were evenly mixed at a weight ratio of 3:7, placed in an oven at 155° C. and treated for 30 minutes to prepare a sulfur-carbon composite.

Examples 3 to 4 and Comparative Examples 7 to 12: Manufacture of Positive Electrode for Lithium-Sulfur Battery 90% by weight of sulfur-carbon composite prepared in Example 1, Example 2, Comparative Example 1 to Comparative Example 6 as a positive electrode active material, 5% by weight of Denka black as an electrically conductive material, and 5% by weight of styrene butadiene rubber/carboxymethyl cellulose (SBR:CMC=7:3) as a binder were added and mixed to prepare a positive electrode slurry composition.

The prepared positive electrode slurry composition was applied onto an aluminum current collector, dried at 50° C. for 12 hours, and compressed with a roll press device to manufacture positive electrodes for lithium-sulfur battery of Examples 3 to 4 and Comparative Examples 7 to 12, respectively.

Examples 5 to 6 and Comparative Examples 13 to 18: Manufacture of Lithium-Sulfur Battery A lithium metal thin film having a thickness of 35 μm was used as a negative electrode together with the positive electrodes prepared in Example 3, Example 4, and Comparative Example 7 to Comparative Example 12, and a mixed solution prepared by dissolving 1M concentration of lithium bis(trifluoromethanesulfonyl)imide (LiTFSI) and 1% by weight of lithium nitrate ($LiNO_3$) in the organic solvent consisting of 1,3-dioxolane and dimethoxy ethane (DOL:DME=1:1 (volume ratio)) was used as an electrolyte, to manufacture lithium-sulfur batteries of Examples 5 to 6 and Comparative Examples 13 to 18, respectively.

Specifically, the prepared positive electrode and the negative electrode are positioned to face each other, and between them, a polyethylene having a thickness of 20 μm and a porosity of 45% is placed as a separator, and then the prepared electrolyte was injected to manufacture a lithium-sulfur battery.

|  | Polymer for coating carbon material | Coating method of carbon material | Sulfur-carbon composite | Positive electrode |
|---|---|---|---|---|
| Battery from Example 5 | prepared from Preparation Example 1 (Monomer molar ratio = 3:7) | carbon material coating (Preparation Example 3) (weight ratio of carbon material:P (DMA-co-PEGMEA) = 99:1) | prepared from Example 1 | manufactured from Example 3 |
| Battery from Example 6 | prepared from Preparation Example 1 (Monomer molar ratio = 3:7) | carbon material coating (Preparation Example 4) (weight ratio of carbon material:P (DMA-co-PEGMEA) = 98:2) | prepared from Example 2 | manufactured from Example 4 |
| Battery from Comparative Example 13 | not used | not coated | prepared from Comparative Example 1 | manufactured from Comparative Example 7 |
| Battery from Comparative Example 14 | prepared from Preparation Example 1 (Monomer molar ratio = 3:7) | sulfur-carbon composite coating (Comparative Example 2) (weight ratio of sulfur-carbon composite:P (DMA-co-PEGMEA) = 99.5:0.5) | prepared from Comparative Example 2 | manufactured from Comparative Example 8 |
| Battery from Comparative Example 15 | prepared from Preparation Example 1 (Monomer molar ratio = 3:7) | sulfur-carbon composite coating (Comparative Example 3) (weight ratio of sulfur-carbon composite:P (DMA-co-PEGMEA) = 99:1) | prepared from Comparative Example 3 | manufactured from Comparative Example 9 |

-continued

| | Polymer for coating carbon material | Coating method of carbon material | Sulfur-carbon composite | Positive electrode |
|---|---|---|---|---|
| Battery from Comparative Example 16 | prepared from Preparation Example 1 (Monomer molar ratio = 3:7) | sulfur-carbon composite coating (Comparative Example 4) (weight ratio of sulfur-carbon composite:P (DMA-co-PEGMEA) = 98:2) | prepared from Comparative Example 4 | manufactured from Comparative Example 10 |
| Battery from Comparative Example 17 | prepared from Preparation Example 2 (Monomer molar ratio = 5:5) | carbon material coating (Preparation Example 5) sulfur-carbon composite coating (Comparative Example 3) (weight ratio of sulfur-carbon composite:P (DMA-co-PEGMEA) = 99:1) | prepared from Comparative Example 5 | manufactured from Comparative Example 11 |
| Battery from Comparative Example 18 | PEO | carbon material coating (Comparative Example 6) | prepared from Comparative Example 6 | manufactured from Comparative Example 12 |

Experimental Example 1: Performance Evaluation of Lithium-Sulfur Battery

For lithium-sulfur batteries prepared in Example 5, Example 6, Comparative Examples 13 to Comparative Example 18, discharging and charging were repeated for 2.5 cycles at a current density of 0.1 C using a charge/discharge measuring device (LAND CT-2001A, Wuhan, China), and were performed for 3 cycles at a current density of 0.2 C, and then discharging capacity and coulomb efficiency were measured, while discharging at 0.5 C and charging at 0.3 C, to evaluate the lifetime characteristics of the battery. The results obtained at this time are shown in FIGS. 1 to 5.

Referring to FIG. 1, it can be seen that the lithium-sulfur battery of Example 5, comprising the sulfur-carbon composite of Example 1 (Weight ratio of carbon material:P (DMA-co-PEGMEA)=99:1) showed better results in lifetime than the lithium-sulfur battery of Example 6 comprising the sulfur-carbon composite of Example 2 (Weight ration of carbon material:P(DMA-co-PEGMEA)=98:2).

Referring to FIG. 2, it can be seen that the lithium-sulfur batteries of Examples 5 and 6 (coating the surface of the carbon material with P(DMA-co-PEGMEA)) (see FIG. 1) showed better results in reactivity and lifetime than the lithium-sulfur battery of Comparative Example 13 comprising the sulfur-carbon composite of Comparative Example 1 (without coating).

Referring to FIG. 3, it can be seen that the lithium-sulfur batteries of Examples 5 and 6 (coating the surface of the carbon material with P(DMA-co-PEGMEA)) (see FIG. 1) showed better results in reactivity and lifetime than the lithium-sulfur batteries of Comparative Examples 14 to 16 comprising the sulfur-carbon composites of Comparative Examples 2 to 4 (coating the surface of sulfur-carbon composite with P(DMA-co-PEGMEA)).

Referring to FIG. 4, it can be seen that the lithium-sulfur battery of Example 5 (using a carbon material coating agent having monomer molar ratio of P(DMA-co-PEGMEA)=3:7) showed better results in reactivity and lifetime than the lithium-sulfur battery of Comparative Example 17 comprising the sulfur-carbon composites of Comparative Example 5 (using a carbon material coating agent having monomer molar ratio of P(DMA-co-PEGMEA)=5:5).

Referring to FIG. 5, it can be seen that the lithium-sulfur battery of Example 5 (using P(DMA-co-PEGMEA) as a carbon material coating agent) showed better results in reactivity and lifetime than the lithium-sulfur battery of Comparative Example 18 comprising the sulfur-carbon composite of Comparative Example 6 (using PEO as a carbon material coating agent).

From these results, it can be confirmed that the lithium-sulfur battery including sulfur-carbon composite proposed in the present invention has excellent reactivity and lifetime characteristics of the battery.

The invention claimed is:

1. A sulfur-carbon composite, comprising:
   a carbon material;
   a coating on a surface of the carbon material, said coating comprising a copolymer, comprising a monomer unit containing a catechol group and a monomer unit containing a lithium ion conductor; and
   sulfur.

2. The sulfur-carbon composite according to claim 1, wherein a molar ratio of the monomer unit containing the catechol group and the monomer unit containing the lithium ion conductor is 1 to 5:5 to 9.

3. The sulfur-carbon composite according to claim 1, wherein a weight average molecular weight of the copolymer is 5,000 to 1,000,000.

4. The sulfur-carbon composite according to claim 1, wherein the copolymer is a random copolymer.

5. The sulfur-carbon composite according to claim 1, wherein the monomer unit containing the catechol group is a vinyl-based monomer.

6. The sulfur-carbon composite according to claim 1, wherein the monomer unit containing the lithium ion conductor is a monomer unit which is capable of polymerizing with the monomer unit containing the catechol group and has lithium ion conductivity.

7. The sulfur-carbon composite according to claim 1, wherein the monomer unit containing the lithium ion conductor is at least one selected from the group consisting of a monomer unit containing an ethylene oxide group and a monomer unit containing a sulfone group.

8. The sulfur-carbon composite according to claim 1, wherein the copolymer is represented by the following Formula 1:

[Formula 1]

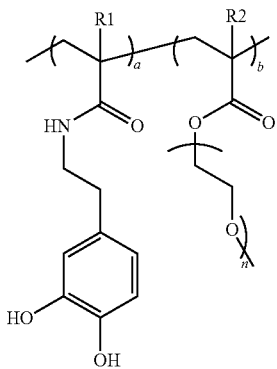

wherein,
R1 and R2 are each independently hydrogen or a methyl group,
a and b represent a molar ratio of each monomer unit, wherein a is 1 to 5, and b is 5 to 9;
n is a natural number from 1 to 20.

9. The sulfur-carbon composite according to claim 1, wherein the carbon material comprises at least one selected from the group consisting of graphite, graphene, carbon black, carbon nanotubes, carbon fibers, carbon nanoribbons, carbon nanobelts, carbon nanorods, and activated carbon.

10. The sulfur-carbon composite according to claim 1, wherein a weight ratio of the copolymer and the carbon material is 0.1:99.9 to 5:95.

11. The sulfur-carbon composite according to claim 1, wherein the sulfur is at least one selected from the group consisting of inorganic sulfur, $Li_2S_n$ (n≥1), disulfide compounds, organic sulfur compounds, and carbon-sulfur polymers.

12. A positive electrode for a lithium-sulfur battery comprising the sulfur-carbon composite of claim 1.

13. A lithium-sulfur battery comprising a positive electrode; a negative electrode; a separator interposed between them; and an electrolyte, wherein the positive electrode is the positive electrode of claim 12.

* * * * *